United States Patent Office 3,219,738
Patented Nov. 23, 1965

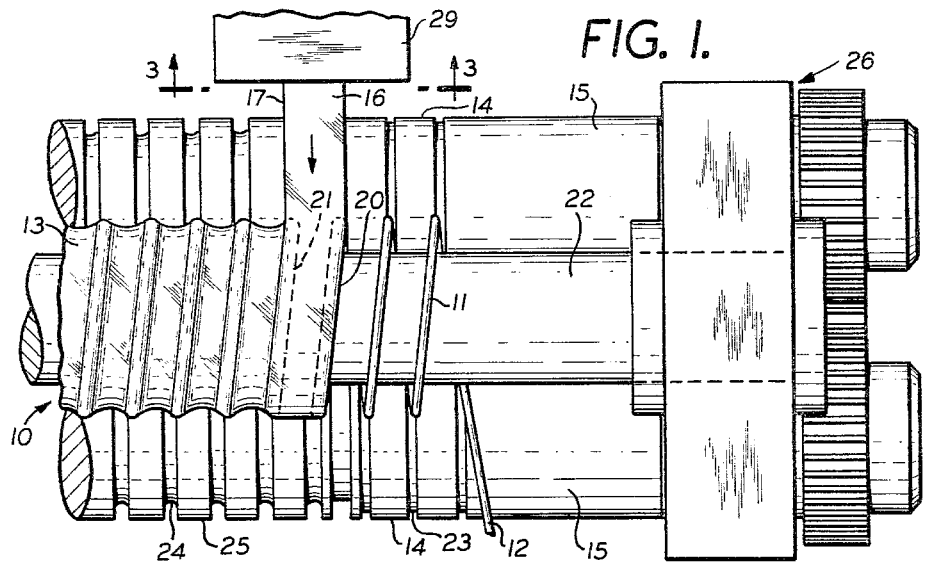
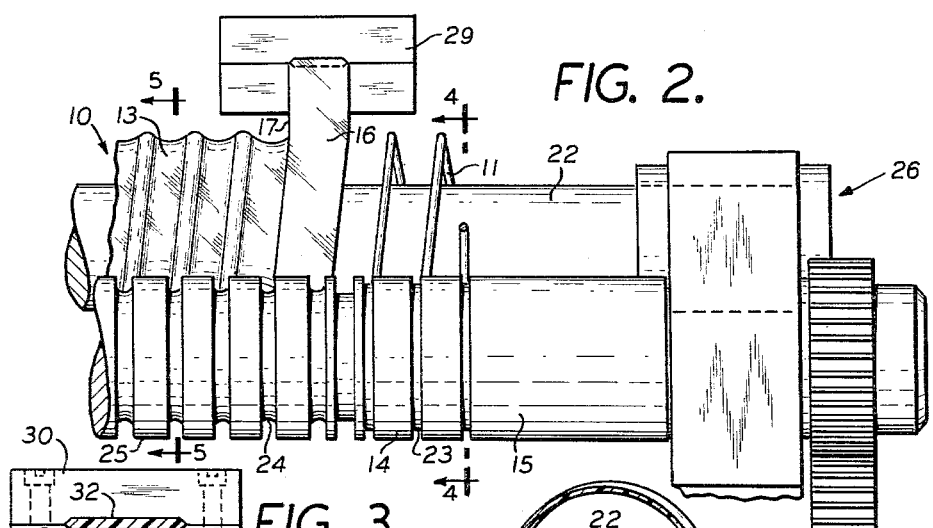
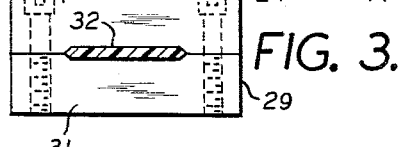
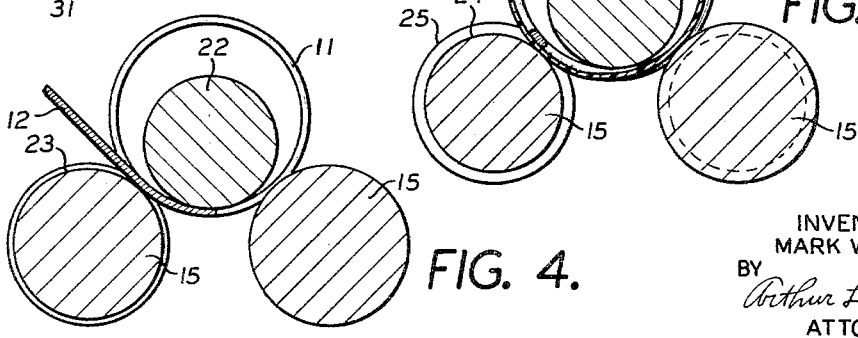
INVENTOR
MARK W. OLSON
BY Arthur L. Whinston
ATTORNEY.

3,219,738
METHOD OF MAKING WIRE-REINFORCED HOSE
Mark W. Olson, Allendale, N.J., assignor to United States Rubber Company, New York, N.Y., a corporation of New Jersey
Filed Nov. 7, 1961, Ser. No. 150,736
7 Claims. (Cl. 264—173)

This invention relates to flexible, wire reinforced plastic hose and, more particularly, to a method of making such hose.

Vinyl plastic hose or tubing is currently used in a variety of applications, especially with vacuum cleaners. The hose is generally formed of a vinyl cover and a helically coiled reinforcing element. Existing methods of manufacture, however, all entail use of a mandrel or other support around which the reinforcing element is wound and the preformed vinyl tubing drawn over it. Use of a mandrel is relatively costly and also limits the rate of output.

Recently there have been disclosed methods of making shaped plasticized linear products from vinyl plastisols by using, in cooperation with either a solvator and/or a turboheater, a fusing die and/or a shaping die. I have particular reference to U.S. patent applications Serial Nos. 678,403, filed August 15, 1957 and now U.S. Patent No. 3,051,995 issued September 4, 1962, and 813,414, filed May 15, 1959, now abandoned in favor of continuation application Serial No. 185,493, filed March 28, 1962 and now U.S. Patent No. 3,173,978 issued March 16, 1965. (The terms "solvator" and "turboheater" refer to apparatus which are described in detail in U.S. Patent No. 3,051,995 and in U.S. Patent No. 2,742,669, respectively.) These two methods are the preferred methods for carrying out the invention; however, another method which can be used for making plasticized linear products from vinyl plastisols is by the use of a conventional extruder equipped with a suitably heated die.

In U.S. Patent No. 3,051,995, there is disclosed a method of manufacturing articles from vinyl plastisols in which the partially solvated resin particles in the plasticizer fluid are heated to a temperature where solvation is rapid and gelation would normally occur. However, by suitably agitating the heated plastisol, gel formation is prevented and a fully solvated, smearable paste is thereby obtained. This paste, it was disclosed, will set to a stiff gel when the agitation is arrested, thus permitting the gelled material to be employed in various manners in the manufacture of useful products when fused at higher temperatures.

In U.S. Patent No. 3,173,978, there is disclosed an improvement to the above method, whereby the solvated resin particles in the liquid plasticizer are subsequently intensely agitated and heated to a point above the fusion temperature of the plastisol material, thus achieving a fully fused material of predetermined viscosity. This latter method requires a solvator for solvating the resin particles and a turboheater for intensely agitating the fully solvated, smearable paste which issues from the solvator.

Accordingly, it is an object of the present invention to produce flexible, wire-reinforced vinyl hose continuously by forming a wire into a helix and simultaneously encasing this shape with a heat-sealable vinyl tape produced by any of the methods described above.

It is a further object of the instant invention to produce such flexible, wire-reinforced vinyl hose without the necessity of using a mandrel. It is a still further object of the invention to produce such hose using precoiled wire, either bare or coated.

These and other objects are achieved in the instant invention by advancing a radially unsupported, helically coiled wire axially past an extrusion die of a vinyl plastisol extruder, continuously melt-extruding a tape of plasticized vinyl material through said die, passing said tape around said coiled wire, the edges of said tape overlapping and coinciding with adjacent coils of said wire, the contiguous edges of said tape being joined to form a continuous tube supported by the coils, and applying pressure to the material of the contiguous edges of said tape to seal the same. The tape consists of a fully fused, viscous, plasticized vinyl material obtained by any of the above-described methods.

Other objects and advantages of the present invention will become apparent as the description proceeds, when read in connection with the accompanying drawings, in which:

FIG. 1 is a plan view of the apparatus used with the instant invention;
FIG. 2 is a front elevational view of the apparatus;
FIG. 3 is a cross-sectional view on line 3—3 of FIG. 1;
FIG. 4 is a cross-sectional view on line 4—4 of FIG. 2; and
FIG. 5 is a cross-sectional view on line 5—5 of FIG. 2.

Referring to the drawings, the hose of the present invention is generally indicated by the reference numeral 10 and comprises a cylindrical reinforcing element 11 in the form of a wire 12 helically coiled, and a vinyl covering 13 sheathing the wire helix 11.

FIGS. 1, 2, 4 and 5 show the apparatus that is used with the method of the invention. Wire 12 is passed through the wire-coiling section 14 of a pair of rollers 15—15 to form a radially unsupported helix 11. A tape 16 of plasticized vinyl material is melt-extruded from an extrusion die 29 of a vinyl plastisol extruder and is wrapped or passed around the rotating wire helix 11. The edges 17 of tape 16 are laid on at the same pitch as the wire 12 and coincide with adjacent coils 20 and 21 of the wire helix 11, thus to form a continuous tube supported by the coils.

A center roll 22, serving solely as a floating guide roll and having a diameter significantly smaller than the helix, cooperates with rollers 15 both to form the wire 12 into helix 11 and also to apply a slight pressure to the material of the contiguous edges 17 of tape 16 to seal the same and make the joints invisible. Roll 22 also cooperates with rollers 15 to shape and form the hose. This is clearly shown in FIGS. 4 and 5.

FIG. 4 is a cross-sectional view on line 4—4 of FIG. 2, taken through wire 12 as it is being continuously formed into helix 11. Rollers 15 are grooved as at 23 to guide wire 12 and form it into the helix. Inasmuch as roll 22 is used merely to supply slight pressure in the helix forming operation, the helically coiled wire is, in fact, radially unsupported.

FIG. 5 is a cross-sectional view on line 5—5 of FIG. 2 taken through helix 11 after vinyl covering 13 has been applied. Rollers 15 are grooved as at 24 to apply light pressure to the contiguous edges 17 of tape 16, thereby to make the joints in the final product invisible. Additionally, those portions 25 of rollers 15 in between the grooved portions 24 contact the center portions of tape 16, in between adjacent coils of helix 11, to impart a corrugated profile to the finished hose. Again, it can be seen from FIG. 5 that roll 22 does not furnish radial support to helix 11 either before or after the application of the vinyl tape 16.

Roll 22 is rotated counter-clockwise and rollers 15 are rotated clockwise (when viewed from the right-hand side of the apparatus) by any suitable apparatus 26, as shown.

Example 1

A wire-reinforced vinyl hose was fabricated experimentally using a pre-coiled coated wire. The vinyl plastisol compound was treated in a solvator and was subsequently fused continuously in a long fusing die. Its chemical composition was:

| Item: | Parts by weight |
|---|---|
| Polyvinyl chloride resin ("Marvinol" brand VR-50) | 50 |
| Plasticizer [1] | 50 |
| Stabilizer [2] | 4.5 |
| Lubricant [3] | 2 |

[1] E.g., dioctyl phthalate or a mixture of 45 parts of dioctyl phthalate with 5 parts of a polymer-type plasticizer such as the epoxy plasticizer known as "G-62" (Rohm and Haas) having a molecular weight of 1000, a specific gravity (25°/15° C.) of 0.99, and a flash point of 316° C.
[2] An organo-metallic type stabilizer, e.g., a barium-cadmium complex organic salt.
[3] E.g., petroleum hydrocarbon oil having a viscosity of 145-155 (SUS) at 100° F. and a specific gravity of 0.898 at 60° F.

The operating conditions of the run were as follows:

| | |
|---|---|
| Pumping rate ____grams/min__ | 13 |
| Issuing speed from die ____feet/min__ | 6 |
| Temperature of solvator ____° F__ | 244 |
| Speed of solvator ____r.p.m__ | 150 |
| Length of die ____inches__ | 6 |
| Temperature of die ____° F__ | 500 |
| Temperature of fused tape ____° F. at surface__ | 400 |
| ° F. at center__ | 300 |
| Operating pressure ____p.s.i__ | 1300 |
| Width of extruded tape at the die exit____inches__ | .625 |
| Thickness of tape ____do____ | .029 |
| Outer diameter of coated wire ____do____ | .080 |
| Outer diameter of bare wire ____do____ | .047 |
| Nominal diameter of helix ____do____ | 1.25 |
| Hose assembly rate ____inches/min__ | 4.6 |

The edges of the die opening were tapered in cross-section (see FIG. 3) and the overlapping cover 13 on the wire helix 11 was, therefore, essentially of a uniform gauge. The contiguous edges 17 of the tape sealed themselves at the overlap as contact was made. The slight pressure applied by the rollers made the joint invisible in the finished product.

Example 2

A satisfactory product was also made using fully fused, viscous, plasticized vinyl material melt-extruded from the turboheater apparatus disclosed in U.S. Patent No. 3,173,978. An extrusion die as shown in FIG. 3 was used. The vinyl plastisol composition used consisted of:

| Item: | Parts by weight |
|---|---|
| Polyvinyl chloride resin ("Marvinol" brand VR-50) | 50 |
| Plasticizer [1] | 50 |
| Stabilizer [2] | 4.5 |
| Red Pigment [3] | 1 |

[1] E.g., dioctyl phthalate or a mixture of dioctyl phthalate (20 parts) with other plasticizers, such as a hydrocarbon oil plasticizer (10 parts of "H-300," Continental Oil, having a molecular weight of 300 and a specific gravity of 0.873 at 25° C.), alkyl aryl modified phthalate (15 parts of "S-213," Monsanto Chemical, having a specific gravity of 1.003 at 25° C.) and an epoxy type plasticizer (5 parts of "G-62," Rohm and Haas).
[2] An organo-metallic type stabilizer, e.g., a barium-cadmium complex organic salt.
[3] E.g., a cadmium medium red paste in dioctyl phthalate (65% pigment).

The operating conditions of the run were as follows:

| | |
|---|---|
| Pumping rate ____grams/min__ | 92 |
| Issuing speed from die ____feet/min__ | 30 |
| Temperature of solvator ____° F__ | 250 |
| Speed of solvator ____r.p.m__ | 120 |
| Temperature of turboheater ____° F__ | 338 |
| Speed of turboheater ____r.p.m__ | 2,000 |
| Temperature of issuing stock ____° F__ | 435 |
| Operating pressure ____p.s.i__ | 300 |
| Width of extruded tape at die exit ____inches__ | .625 |
| Thickness of tape ____do____ | .034 |
| Outer diameter of coated wire ____do____ | .080 |
| Outer diameter of bare wire ____do____ | .047 |
| Nominal diameter of helix ____do____ | 1.25 |
| Hose assembly rate ____inches/min__ | 32.5 |

Although FIGS. 1, 2, 4 and 5 disclose a means for coiling wire as a part of the hose forming apparatus, it should be understood that precoiled wire may also be used either in the coated (as with vinyl) or bare condition. For example, Examples 1 and 2 involved the use of coated precoiled wire, as stated. Furthermore, it should be understood that where the wire is to be coiled as part of the process, the coiling can be done by any of several well known methods, of which the method illustrated is but one. Any wire that may be coiled may be used as the reinforcing element in the method of the instant invention.

The examples above disclosed used coated wire. This is desirable when it is necessary to insure a firm bond between the wire and the covering 13, as, for example, when fabricating hose to be used in heavy-duty service. It probably would not be as important for the ordinary vacuum cleaner hose.

Where bare wire is used to start with, the hose may be made by a dual operation. A first processing apparatus would coat the wire 12 either before or immediately after it is coiled. The method disclosed in either U.S. Patent No. 3,173,978 or U.S. Patent No. 2,855,631 may be used for this purpose. Following the coating of the wire, a second apparatus would be used to produce hose by wrapping tape about the helix as above described.

An alternative to pre-coating the wire helix is to apply the vinyl covering to both inside and outside surfaces of the coil. This can be accomplished by using two separate extrusion dies, one feeding directly inside the coil, and the other wrapping the outside as above described.

An extrusion die suitable for use with the method of this invention is the two-piece ribbon die 29 shown in FIG. 3. It consists of upper and lower plates 30 and 31 which define an orifice 32. Plates 30 and 31 are bolted together as shown. For a ⅝ inch wide tape, orifice 32 should have a center rectangular section approximately ½ inch wide tapering at the edges as shown. A preferred material is stainless steel.

The corrugated profile of the finished hose 10 is achieved in part by the slight downward flow of tape 16 as it is applied (due to gravity) and in part by the roller action as previously described. There is, however, no appreciable tension applied to either the helix 11 or the tape 16 during the wrapping operation. The corrugated profile of the finished hose may also be achieved without the aid of the rollers. With proper operating conditions, e.g., rate of extrusion and speed of the coiled wire, this can be readily accomplished. However, it is doubtful whether the joints in the cover at the overlapping edges 17 would be wholly invisible in the finished product without the use of some pressure by rollers 15.

It should be understood that the larger the spacing or pitch of the coils in the wire helix 11, the greater the thickness of vinyl tape required. The size of the wire and pitch of the coil depend, of course, on the final use required of the hose.

Having thus described my invention, what I claim and desire to protect by Letters Patent is:

1. A method of making a flexible, wire-reinforced, inwardly corrugated, plastic hose, comprising the steps of advancing a rotating helically coiled wire of constant pitch axially past the extrusion die of a thermoplastic extruder, continuously melt-extruding through said die a tape of viscous thermoplastic material the width of which is slightly greater than the pitch of said helically coiled wire, initially directing the leading end of said tape in the viscous state thereof with respect to said helically coiled wire so that the two lateral edges of said tape overlie and come into adhering engagement with two adjacent turns of said wire, respectively, and thereafter maintaining a predetermined relationship between the speed of extrusion of said tape and the speeds of rotation and axial advance of said helically coiled wire to cause said tape to be entrained around the exterior of said helically coiled wire by virtue of the rotation of the latter, with the lateral edges of each turn of said tape overlying the respective pair of adjacent turns of said helically coiled wire and engaging the lateral edges of the next adjoining turns of said tape in seam-forming relation, and with the medial portion of each turn of said tape between the associated adjacent turns of said wire physically unsupported from interiorly of the coil, whereby each increment of length of said medial portion of said tape upon being laid onto said helically coiled wire sags inwardly of the coil under the force of gravity during an initial part of its joint rotation with said helically coiled wire while becoming at least partially set in its inwardly sagging state before the respective part of said helically coiled wire has completed one half turn of its rotation.

2. The method of claim 1, wherein said tape is extruded so that the lateral edges thereof are outwardly tapered in cross-section, and the width of said tape is such that said engaging lateral edges of adjoining turns of said tape are in overlapped relation to each other.

3. A method of making a flexible, wire-reinforced, inwardly corrugated, plastic hose, comprising the steps of advancing a rotating helically coiled wire of constant pitch axially past the extrusion die of a thermoplastic extruder, continuously melt-extruding through said die a non-self-sustaining tape of viscous thermoplastic material the width of which is slightly greater than the pitch of said helically coiled wire, initially directing the leading end of said tape in the viscous state thereof with respect to said helically coiled wire so that the two lateral edges of said tape overlie and come into adhering engagement with two adjacent turns of said wire, respectively, thereafter maintaining a predetermined relationship between the speed of extrusion of said tape and the speeds of rotation and axial advance of said helically coiled wire to cause said tape to be entrained around the exterior of said helically coiled wire by virtue of the rotation of the latter, with the lateral edges of each turn of said tape overlying the respective pair of adjacent turns of said helically coiled wire and engaging the lateral edges of the next adjoining turns of said tape in seam-forming relation, and with tthe medial portion of each turn of said tape between the associated adjacent turns of said wire physically unsupported from interiorly of the coil, whereby each increment of length of said medial portion of said tape upon being laid onto said helically coiled wire sags inwardly of the coil under the force of gravity during an initial part of its joint rotation with said helically coiled wire while becoming partially set and rendered form-sustaining in its inwardly sagging state before the respective part of said helically coiled wire has completed one half turn of its rotation, and applying a light pressure to the engaging lateral edge regions of adjoining turns of said tape on the respective turns of said wire to fuse said lateral edges of said tape and make the seam therebetween invisible.

4. The method of claim 3, wherein the pressure on the engaging lateral edges of said adjoining turns of said tape is applied by subjecting said helically coiled wire from interiorly of the coil to a force yieldingly and lightly urging said helically coiled wire and the tape adhered thereto against at least one counter surface located exteriorly of the coil.

5. The method of claim 4, wherein said tape is extruded so that the lateral edges thereof are outwardly tapered in cross-section, and the width of said tape is such that said engaging lateral edges of adjoining turns of said tape are in overlapped relation to each other.

6. A method of making a flexible, wire-reinforced, inwardly corrugated, plastic hose, comprising the steps of continuously forming a wire into a rotating helix of constant pitch, advancing the rotating helically coiled wire axially past the extrusion die of a thermoplastic extruder, continuously melt-extruding through said die a non-self-sustaining tape of fully fused viscous plasticized vinyl material the width of which is slightly greater than the pitch of said helically coiled wire, initially directing the leading end of said tape in the viscous state thereof with respect to said helically coiled wire so that the two lateral edges of said tape overlie and come into adhering engagement with two adjacent turns of said wire, respectively, thereafter maintaining a predetermined relationship between the speed of extrusion of said tape and the speeds of rotation and axial advance of said helically coiled wire to cause said tape to be entrained around the exterior of said helically coiled wire by virtue of the rotation of the latter with the lateral edges of each turn of said tape overlying the respective pair of adjacent turns of said helically coiled wire and engaging the lateral edges of the next adjoining turns of said tape in seam-forming relation, and with the medial portion of each turn of said tape between the associated adjacent turns of said wire physically unsupported from interiorly of the coil, whereby each increment of length of said medial portion of said tape upon being laid onto said helically coiled wire sags inwardly of the coil under the force of gravity during an initial part of its joint rotation with said helically coiled wire while becoming partially set and rendered form-sustaining in its inwardly sagging state before the respective part of said helically coiled wire has completed one half turn of its rotation, and applying a light pressure to the engaging lateral edge regions of adjoining turns of said tape on the respective turns of said wire to fuse said lateral edges of said tape and make the seam invisible.

7. The method of claim 6, wherein said wire is precoated with a vinyl plastisol prior to the laying of said tape thereonto.

References Cited by the Examiner

UNITED STATES PATENTS

| | | | |
|---|---|---|---|
| 2,513,106 | 6/1950 | Prendergast | 18—59 |
| 2,539,853 | 1/1951 | Meyers et al. | 156—143 XR |
| 2,630,157 | 3/1953 | Smellie | 156—143 XR |
| 2,722,263 | 11/1955 | Beare et al. | 156—195 |
| 2,730,761 | 1/1956 | Castellan | 156—143 |
| 2,730,762 | 1/1956 | Ballard | 156—143 |
| 2,731,070 | 1/1956 | Meissner | 156—143 |
| 3,089,535 | 5/1963 | Vohrer et al. | 156—143 |
| 3,126,306 | 3/1964 | Sherman | 156—187 |

ROBERT F. WHITE, *Primary Examiner.*

MICHAEL V. BRINDISI, MORRIS LIEBMAN, ALEXANDER H. BRODMERKEL, *Examiners.*